US005744088A

United States Patent [19]
De Cuyper

[11] Patent Number: 5,744,088
[45] Date of Patent: Apr. 28, 1998

[54] METHOD AND APPARATUS FOR MANUFCTURING HOLLOW OBJECTS, IN PARTICULAR PLASTIC PREFORMS

[75] Inventor: Dirk De Cuyper, Dendermonsesteenweg, Belgium

[73] Assignee: Simeco, Engi, Switzerland

[21] Appl. No.: 495,611

[22] PCT Filed: Jan. 20, 1994

[86] PCT No.: PCT/BE94/00007

§ 371 Date: Jul. 19, 1995

§ 102(e) Date: Jul. 19, 1995

[87] PCT Pub. No.: WO94/16871

PCT Pub. Date: Aug. 4, 1994

[30] Foreign Application Priority Data

Jan. 20, 1993 [BE] Belgium .................. 9300055

[51] Int. Cl.$^6$ .................. B29C 45/00; B29C 45/40
[52] U.S. Cl. .................. 264/297.2; 264/297.8; 264/328.8; 264/334; 425/444; 425/556; 425/577
[58] Field of Search .................. 264/297.2, 297.8, 264/328.8, 334; 425/444, 556, 577

[56] References Cited

U.S. PATENT DOCUMENTS

| | | | |
|---|---|---|---|
| 4,209,290 | 6/1980 | Rees et al. | 425/547 |
| 4,592,719 | 6/1986 | Bellehache et al. | 425/526 |
| 4,721,452 | 1/1988 | Delfer, III | 425/556 X |
| 4,836,767 | 6/1989 | Schad et al. | 425/556 X |

FOREIGN PATENT DOCUMENTS

| | | |
|---|---|---|
| 158105 | 10/1985 | European Pat. Off. . |
| 592021 | 4/1994 | European Pat. Off. . |
| 2160987 | 6/1973 | Germany . |
| 2084907 | 4/1982 | United Kingdom . |

OTHER PUBLICATIONS

Patent Abstracts of Japan, vol. 11, No. 302 (M–629) (2749) 2 Oct. 1987 & JP,A,62–094,319 (Fanuc) 30 Apr. 1987.

*Primary Examiner*—Leo B. Tentoni
*Attorney, Agent, or Firm*—Ladas & Parry

[57] ABSTRACT

Method for manufacturing plastic objects, in particular preforms, in which the raw material for manufacturing said objects is injected into a mould, in which said objects are cooled for hardening said injected raw material to a solid object and in that the manufactured objects are removed from the mould by means of two gripper elements (41, 42) and apparatus therefor.

9 Claims, 8 Drawing Sheets

METHOD AND APPARATUS FOR MANUFCTURING HOLLOW OBJECTS, IN PARTICULAR PLASTIC PREFORMS

FIELD OF THE INVENTION

This invention relates to a method for manufacturing hollow objects, in particular plastic preforms for subsequently processing to PET objects.

BACKGROUND

In a known production process PET granules are predried and subsequently processed in the injection moulding process to semi-finished products such as preforms. In this case the injection moulding process comprises a series of successive operations, namely metering and injecting the raw materials into a mould, subsequent pressing thereof by means of a mould, and cooling and unmoulding. In the case of preforms it is customary to remove the products from the mould by means of one gripper element provided with sleeves which are directly or indirectly cooled. The gripper element is provided in order to simplify the ejection process in which the preform is unmoulded. Subsequent cooling is necessary in this case, in order to minimize the deformation of or damage to the preforms. This can also be applied to other production of plastics. During the injection phase into the mould the liquid raw material is injected into the mould between its mandrel and cavity. The mandrel and the cavity are cooled during the injection moulding process. In order to give the preforms to be unmoulded sufficient stability, the cooling time must be accurately set. The cooling time is therefore an important parameter in the injection moulding cycle.

The cooling time will in fact influence the total cycle time of the process. The longer the cooling time, the longer the cycle time will be, and there will thus be a reduced output.

One gripper element means that there can be cooling for virtually one cycle time. However, this is still too little to reduce the cooling time during the injection moulding process, and production continues with cycle times which are too long.

In a known method, one gripper element which is provided with different sleeves as accommodation elements is used. The preforms remain two or more cycles in the sleeves on said one gripper element. The disadvantage in this case is that the gripper element is very heavy, so that more water has to be used, with a resulting increasing so-called shot weight or impulse, and with an increasing number of sleeves. This results in loss of time and a length adjustment and precision problem for the gripper, for the latter has to assume a number of different positions in the mould in each case during the takeover. Early wear also occurs, and the unmoulding time increases, through the heavy handling due to the higher inertia of the apparatus. In addition, the gripper element emerges from the machine laterally, with the result that a considerable surface area is taken up and rendered useless, so that rather a large amount of space is required for the apparatus. Access to the mould is consequently made very difficult, owing to the lateral removal of the gripper element, and this is quite inconvenient for maintenance.

The use of one gripper element with sleeves, in the case of which after a cycle the preforms are discharged and deposited on an air-cooled conveyor belt with pins is also known. A first disadvantage in this case is that cooling after one unmoulding time cycle is not sufficiently intensive.

A further disadvantage of this method is that the positioning of the mandrels increases the complexity of the production process.

In another known method, use is made of a gripper element with sleeves, in the case of which the preforms are cooled and conveyed to an external cooling station, which is external to the actual apparatus for carrying out the method.

In addition to inadequate cooling, there is the disadvantage here of the greater complexity of the cooling stations. For, the cooling moulds generally no longer correspond to the shrinkage of the preforms during cooling. This leads to uneven cooling of the preforms and to possible damage of the preforms. For, it has been found that preforms, in particular PET preforms, have the best cooling properties on the outside wall (heat expands outwards), and the greatest surface area for dissipating heat is precisely the external surface. For this reason, the use of cooled sleeves is particularly appropriate. The is therefore a great advantage when producing the preforms to allow them to cool as long as possible in the sleeves and to keep the cooling during the injection moulding phase as short as possible.

SUMMARY OF THE INVENTION

The object of the invention is to eliminate the abovementioned disadvantages, and thus to minimize the cooling time in the injection moulding process and transfer it externally, and to keep the preforms further in cooled sleeves.

In the method for manufacturing hollow objects, in particular plastic preforms intended for subsequent processing to PET objects, the raw material for manufacturing said preforms is injected into a mould which has a cavity side and a corresponding mandrel side, between which sides the preforms are formed, the mould is opened into its cavity side and mandrel side, in which case each of the mandrels of the mandrel side bears a preform, and a gripper element on which a set of accommodation elements is disposed is set in motion, being driven by a drive unit for that purpose in a preset direction of movement between a deflected, disconnected position, in which said gripper element is not active and is standing ready for further movement to a working position, and said working position, which is directed at the mandrel side of the mould, while the preforms are accommodated in the gripper element by means of suction means, each preform being accommodated in a corresponding accommodation element.

According to the invention, at least one second gripper element is selected, and said at least one second gripper element is moved, by being driven by a second drive unit, between the disconnected position and the working position directed at the mandrel side of the mould, said gripper elements being synchronized with each other, for the purpose of taking over the formed preforms in succession and discharging them. This means that, thanks to the invention, the cooling carried out in the injection moulding process can be applied externally. Unmoulding will be effected with a shorter cycle time, or a shorter cooling time, and cooling will be outside the apparatus according to the invention in a cooled gripper element. This means that the preform can be cooled externally, with the result that the quality is raised.

Furthermore, a smaller number of sleeves is required per gripper element, with the result that each gripper element is considerably lighter and easier to handle.

According to a further embodiment of the method according to the invention, the gripper elements are moved in a to and fro movement in the direction of their respective longitudinal axes, the gripper elements being disposed above the mould, and their respective movements relative to each other being shifted in time.

This means that each gripper element can be moved vertically, i.e. in its suspension direction, with the result that forces associated with the movement are considerably smaller. The moment of inertia of the gripper elements is also considerably lower, and they can consequently be moved much more quickly.

According to yet a further embodiment of the invention, said at least two gripper elements are disposed on a carrier in an erection plane which is virtually perpendicular relative to the ground, and are moved in said erection plane in a second direction, by being driven by a further drive unit between a waiting position and said disconnected working position.

According to a special embodiment of the invention, said at least two gripper elements are moved successively in two directions which are virtually orthogonal relative to each other, said first direction of movement being selected so that it is virtually vertical relative to the ground, and the two gripper elements being moved between a high and a low working position respectively.

According to a more specific embodiment of the invention, a first cooling time is set for cooling the injected preforms in the cavity side, while at the end of the set first cooling time the cavity side and the mandrel side of the mould are separated from each other, to a distance between them which is sufficient for the insertion of one of said gripper elements into a space thus formed between cavity side and mandrel side, the accommodation side of said one gripper element is directed towards the mandrel side, said one gripper element is moved from said disconnected high position to said space, and said one gripper element is thus taken into said low working position relative to the mandrel side, and the preforms are cooled there in the in each case corresponding accommodation elements during a second set cooling time, at the end of said cooling time the preforms are passed from the mandrel side to said one gripper element and each into an accommodation element corresponding to each mandrel, following which said one gripper element is moved back into the disconnected, high position, both gripper elements are moved crosswise until the further gripper element is in the disconnected, high position and the one gripper element is in said waiting position, and the movement carried out by said one gripper element during the complete cycle is then carried out in the same way by the further gripper element, and a further set of preforms is thus taken over by the latter from the mandrel side of the mould, and said further gripper element is then driven back to the high position.

This invention also relates to an apparatus for manufacturing hollow objects, in particular plastic preforms intended for subsequently processing to PET objects, comprising a mould for forming said preforms, which mould has a cavity side and a mandrel side, which sides can be taken apart, and on which mandrel sides a number of projecting mandrels are disposed, for the purpose of holding the preforms, and comprising a gripper element provided with a set of accommodation elements which can be directed at said mandrels, for cooling and receiving the preforms, said gripper element being movable, by being driven by a drive unit, between a disconnected position and a connected working position in which said gripper element is connected to the mandrel side.

According to the invention, at least one second gripper element is provided, said gripper element being equipped with a further set of accommodation elements, by means of which the mandrels of the mandrel side of the mould can be directed, said at least second gripper element being movable, by being driven by a further drive unit, between said disconnected position and said working position, and the latter mentioned gripper element being connected to the mandrel side, while the latter movement can be synchronized with that of the first gripper element.

BRIEF DESCRIPTION OF THE DRAWINGS

Further special features and advantages of the invention will emerge from the more detailed description of an exemplary embodiment which follows with reference to appended drawings.

Figure 1:
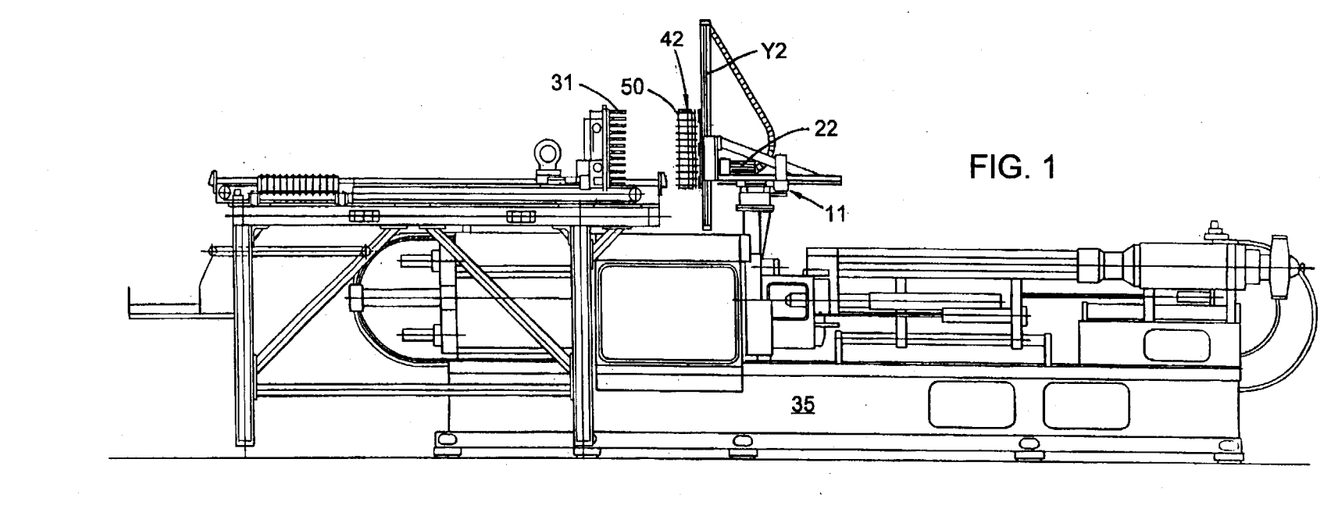
FIG. 1 is a diagrammatic side view of an apparatus according to the invention.
Figure 2:
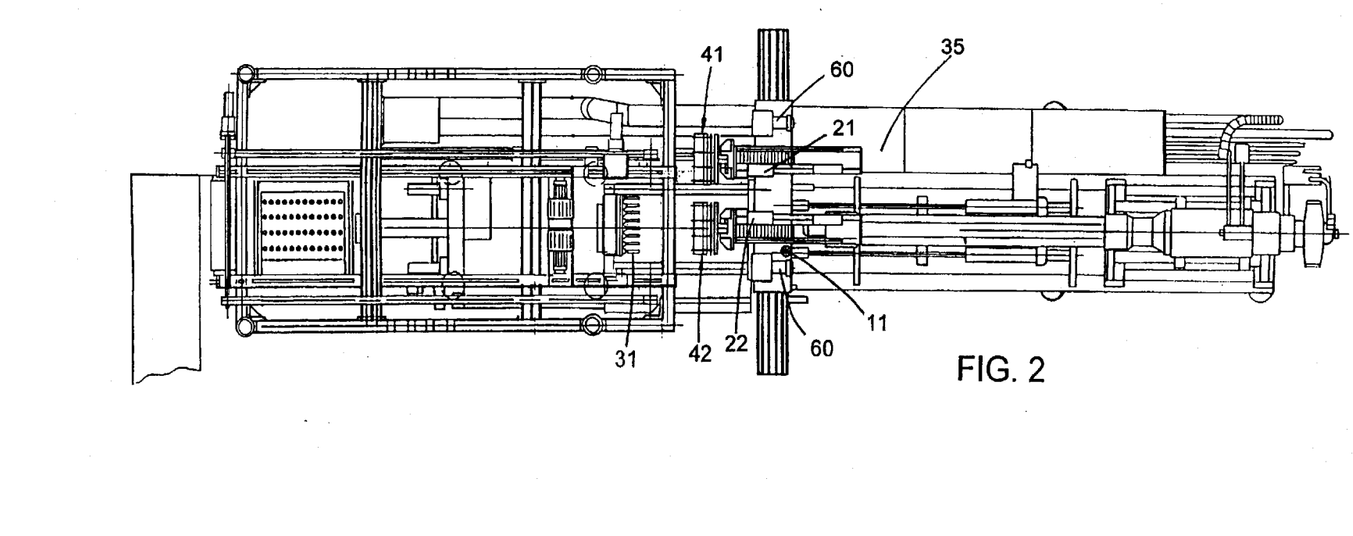
FIG. 2 is a diagrammatic top view of an apparatus according to the invention.
Figure 3:
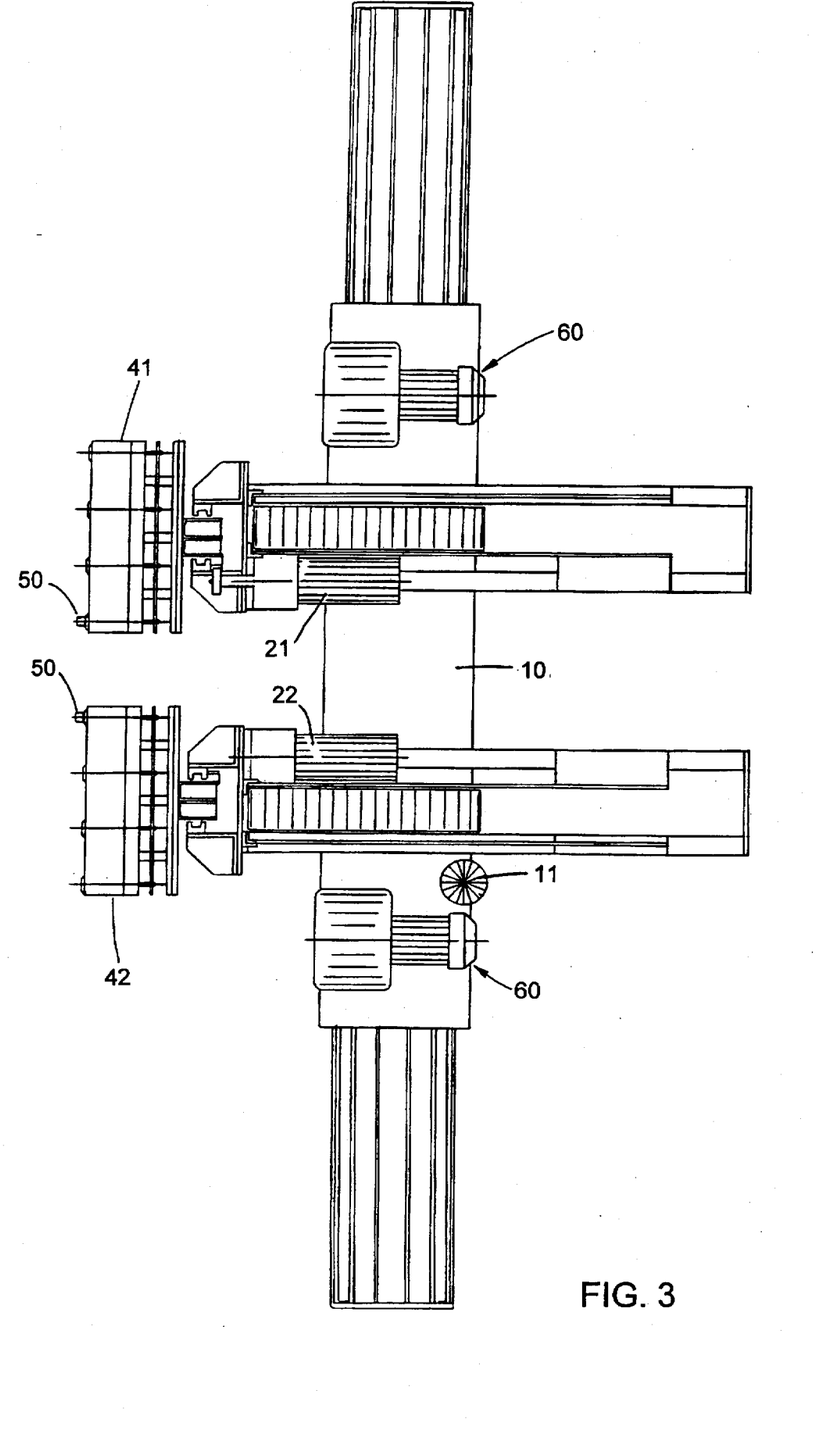
FIG. 3 is a detailed view of a part of the apparatus according to the invention.
Figure 4:
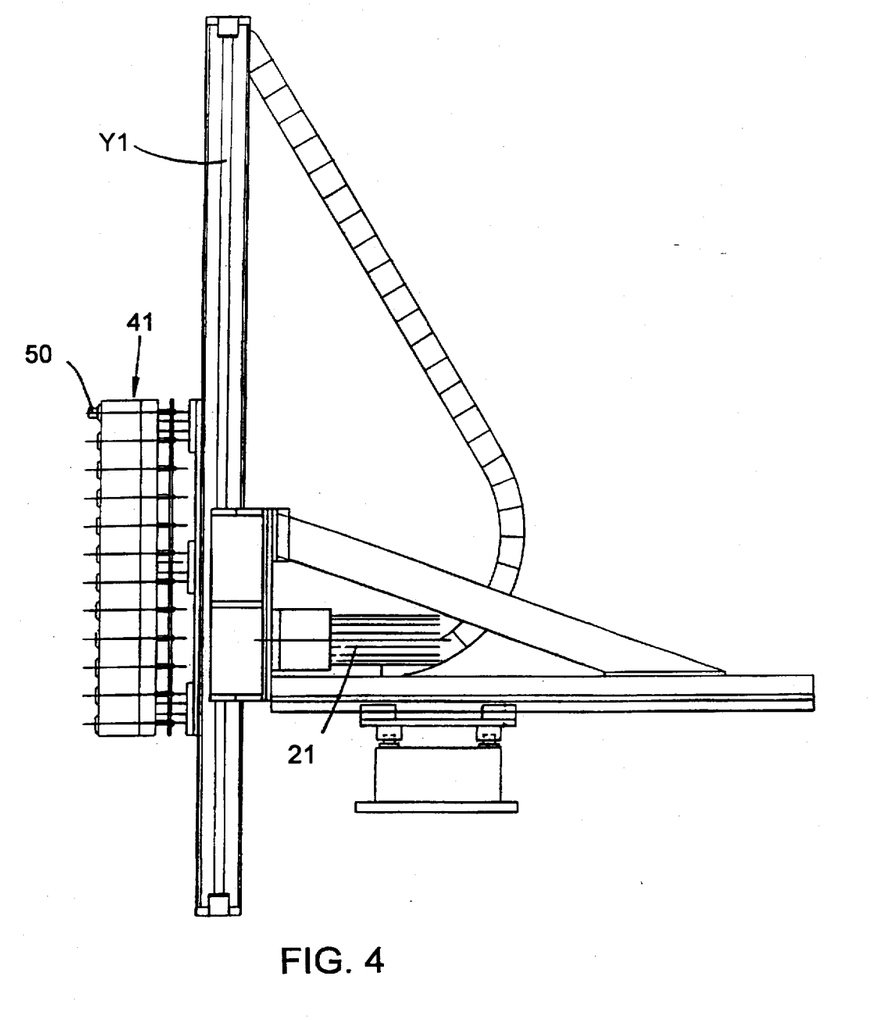
FIGS. 4 and 5 show further details of the view of FIG. 3.
Figure 5:
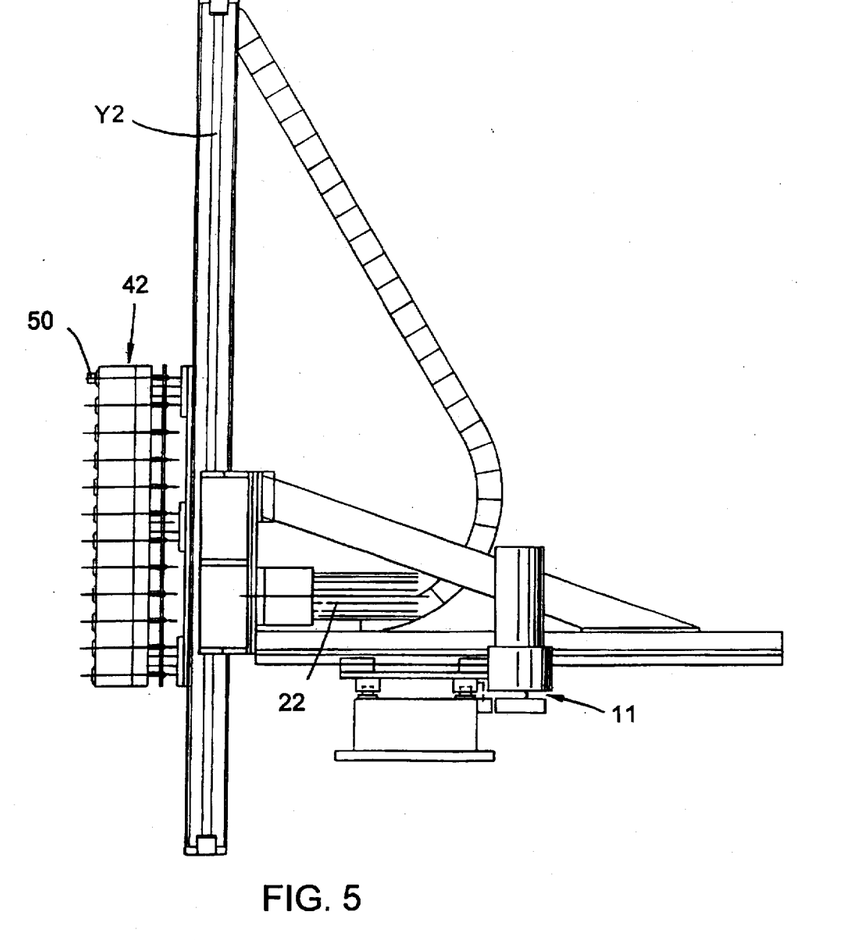

An apparatus according to the invention which comprises an unmoulding plate with two or more gripper elements is shown in FIGS. 1 and 2, and in more detail in FIG. 3.

DETAILED DESCRIPTION OF PREFERRED EMBODIMENTS

Each gripper element 41, 42, hereinafter also called gripper arm, is equipped with a set of sleeves 16, one sleeve being provided for each mandrel 31 of a mould 30 which has a mandrel side 33 and a cavity side 32. The number of sleeves in the gripper arm 41, 42 is determined by the number of mandrels 31 in the mould. The production method consists of injection moulding so-called preforms 50 by means of an injection moulding machine 35 having an inbuilt injection mould. At the end of a first cycle time the machine is opened and the mould 30 splits into the cavity side 32, or the hollow side, on the one hand, and mandrel side 33, on the other. The cavity side 32 of the mould 30 is situated on a fixed machine platform 36, while the mandrel side 33 is fixed on a movable platform 37 of the machine. When said cycle has ended, the hollow products 50 remain on the respective mandrels 33 of the mandrel side, due to the retaining action of a so-called mandrel puller 38 by way of a locally fitted clamping connection, for example a threaded connection 39, such as that shown in FIG. 6. The mandrel puller comprises, for example, two ring halves which are connected to each other around the base of each mandrel 31. During the ejection of the preforms the mandrel puller is pushed a certain distance along the mandrel wall towards the tip of the mandrel, in the course of which, due to said threaded connection 39 between mandrel puller 38 and preform 50, the base of the preform 50 is pulled along the mandrel 31, and the preform is thus prepared for its takeover by the gripper element 41, 42.

Figure 7:
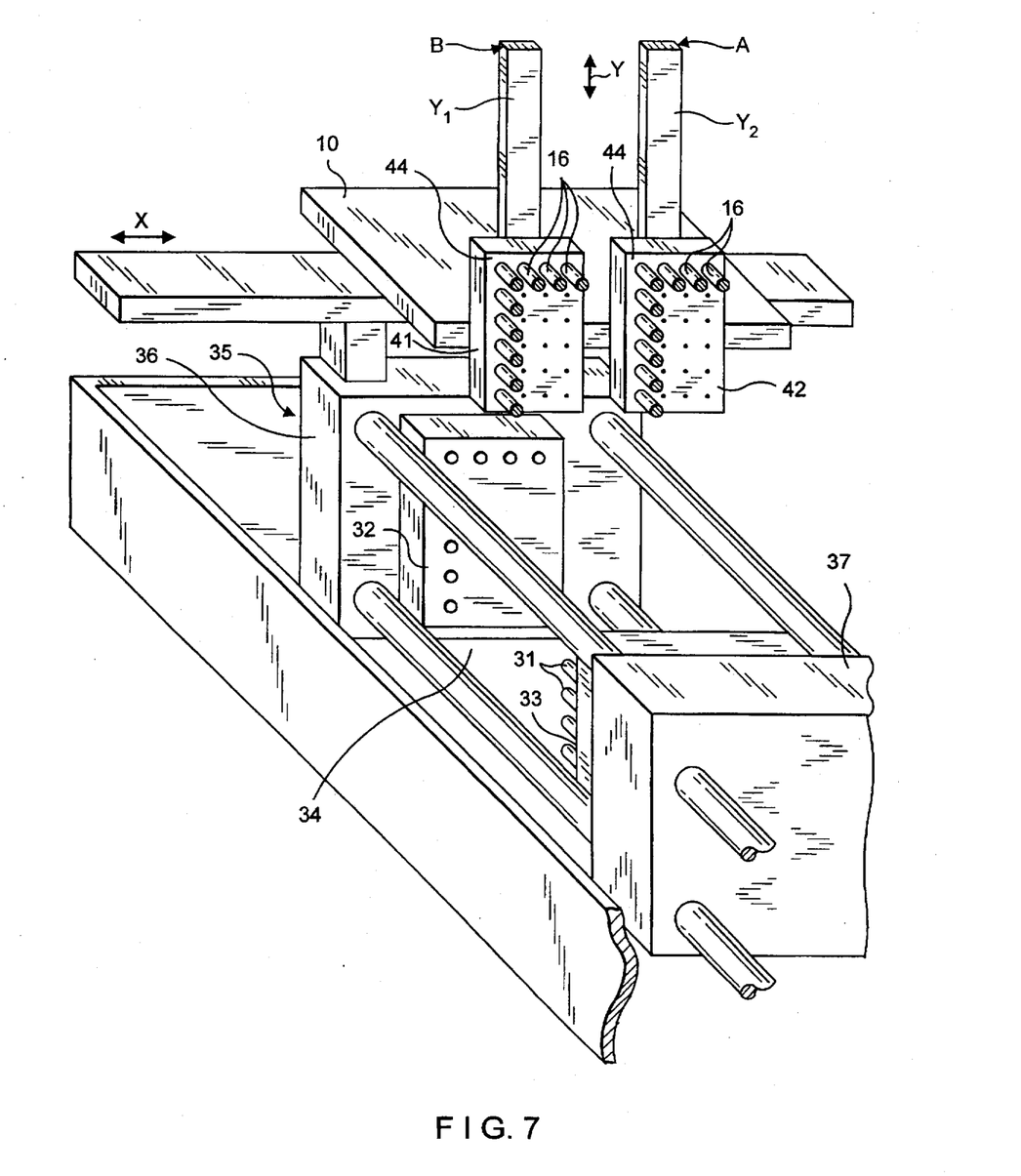
FIGS. 7 to 10 are diagrammatic views of an apparatus according to the invention, in various positions.
Figure 8:
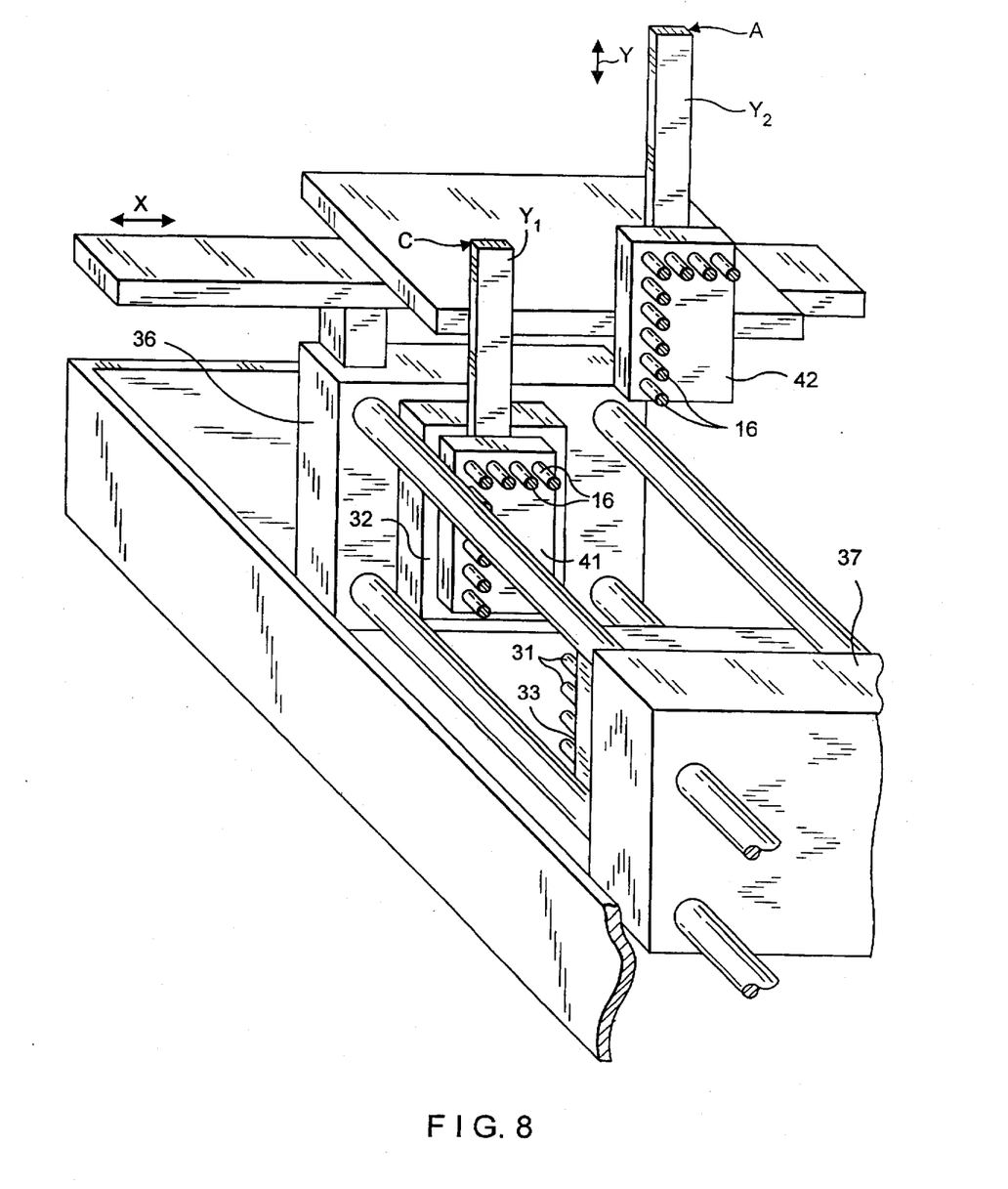

During opening of the machine the mandrel side opens with the movable platform 37, and an open space 34 is produced between the cavity side and the mandrel side. Said space 34 is produced in order to give access for one of the gripper arms 41, 42 between the cavity side and the mandrel side of the mould. One gripper arm, for example 41, is positioned from a high, disconnected position B (FIG. 7) until it is between the mould, in which case during ejection the preforms 50 can be transferred easily to the sleeves 16 of one gripper arm 41, into the working position C (FIG. 8). The gripper arm can be set in motion by, for example, a hydraulic, electric or pneumatic drive motor 21. The sleeves on the gripper arm are positioned in a way corresponding to the corresponding mandrels on the mould.

On reaching working position C, in which the ends of the sleeves 16 are a short distance from the corresponding mandrel tips, the preforms 50, which are already particularly ejected from the mandrel 31, are sucked into the respective sleeves 16 by the action of suitable suction means 60, for example a suction pump. When the preforms 50 have been transferred from mandrel to sleeve, the one gripper arm 41 returns to the disconnected position B in FIG. 7. The preforms can be transferred in various ways, for example through vacuum suction by the sleeves or by ejection of the preforms from the mandrel, or also by both, ejection and then suction.

According to the invention, a so-called multiaxis gripper arm device is provided, which gripper arm comprises at least a second gripper element 42, the two gripper elements 41, 42 each being driven individually by means of a separate drive unit 21, 22 designed for the purpose.

Figure 6:
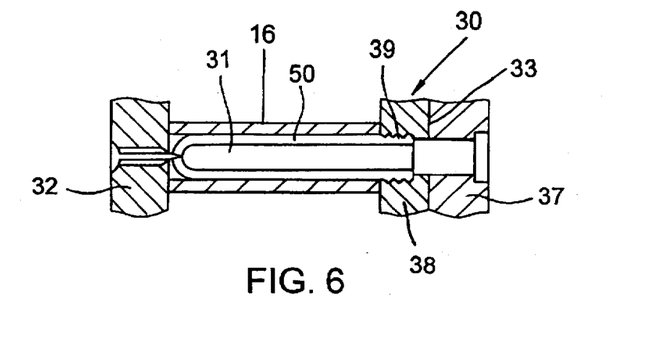
FIG. 6 is a partial view of a section of a mould in which a preform according to the invention is produced.

The interaction of the two gripper arms 41, 42, which according to the invention are synchronized, is described below with reference to FIGS. 7 to 10. During said first cycle S1 the machine opens at the end of a first cooling period (first cooling), in which case injected preforms 50 are resting on the mandrel side of the mould, as shown in FIG. 6. As soon as a space 34 is formed between mandrel side 33 and cavity side 32 which is large enough to place the first gripper arm 41 between mandrel side and cavity side, and a reliable transfer of the preforms is possible, the gripper arm 41 is moved, by being driven by the motor 21, along Y1 axis between the mandrel side and cavity side of the mould, as shown in FIG. 8, until it is in the transfer position, which is the working position shown at C. The first gripper element 41 then takes over a complete first set of preforms 81 from the mandrel side 33 of the mould. When the preforms have been transferred, the first gripper arm 41 and Y1 axis is driven back to the disconnected or high position (see FIG. 7). In that position the preforms 50 are held in the respective sleeves 16 of the first gripper arm 41 during a subsequent cycle SV1 which starts from the moment that the first gripper element 41 is driven into said disconnected position B. Here the preforms 50 are accommodated in their respective sleeves, where they are subjected to an appropriate cooling.

Figure 9:
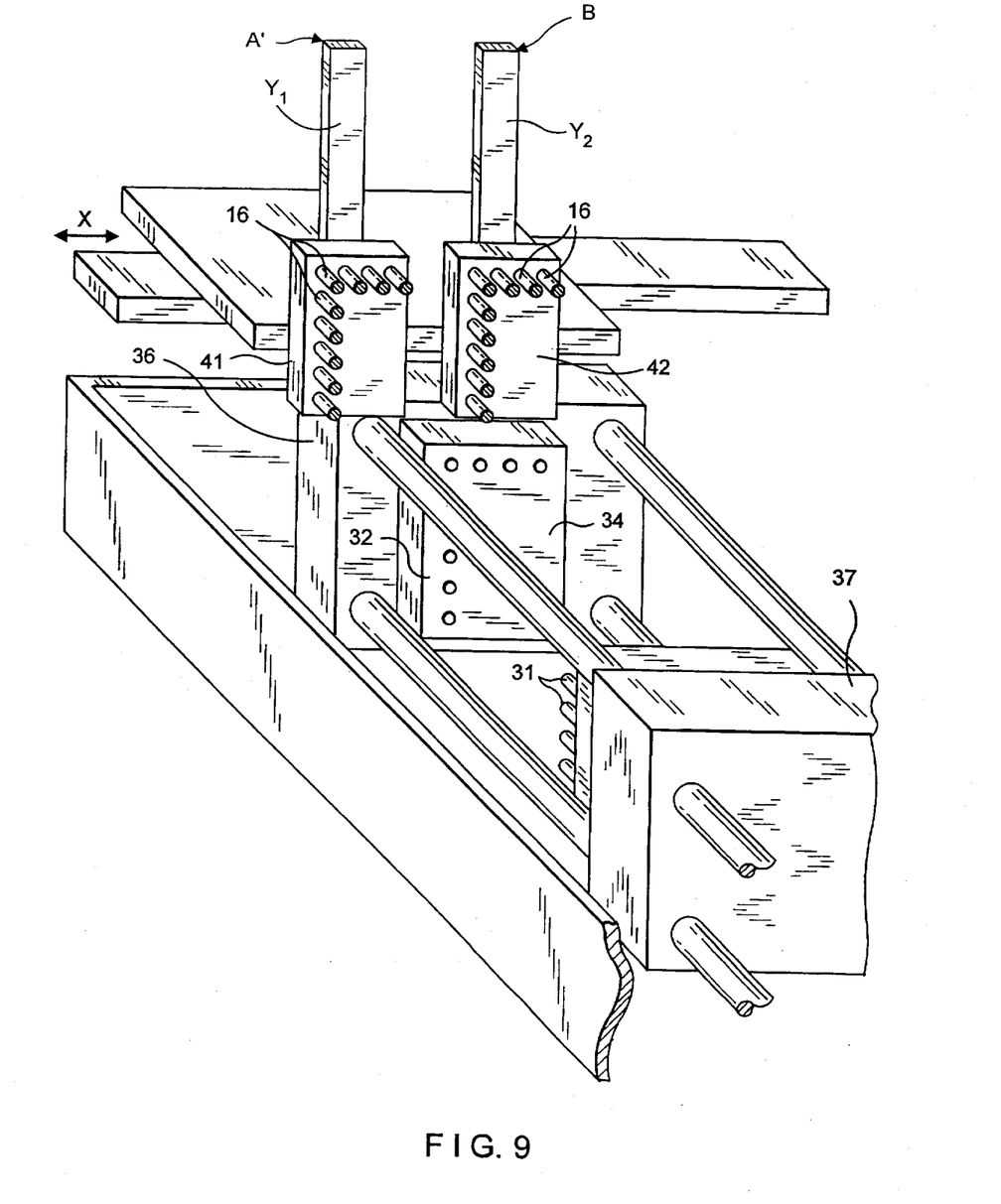

Shortly before the end of cycle SV1 the second gripper arm 42 is moved from the waiting position A into the disconnected, high position B, while the first gripper arm 41 is moved to the non-active waiting position shown at A' in FIG. 9. This movement of the two gripper elements 41 and 42 is preferably simultaneous in the direction of arrow X, where carrier plate 10 is moved by being driven by a further motor 11 (see FIG. 9), but this movement can be achieved in any other way. A similar takeover process is carried out with the second gripper element 42.

Figure 10:
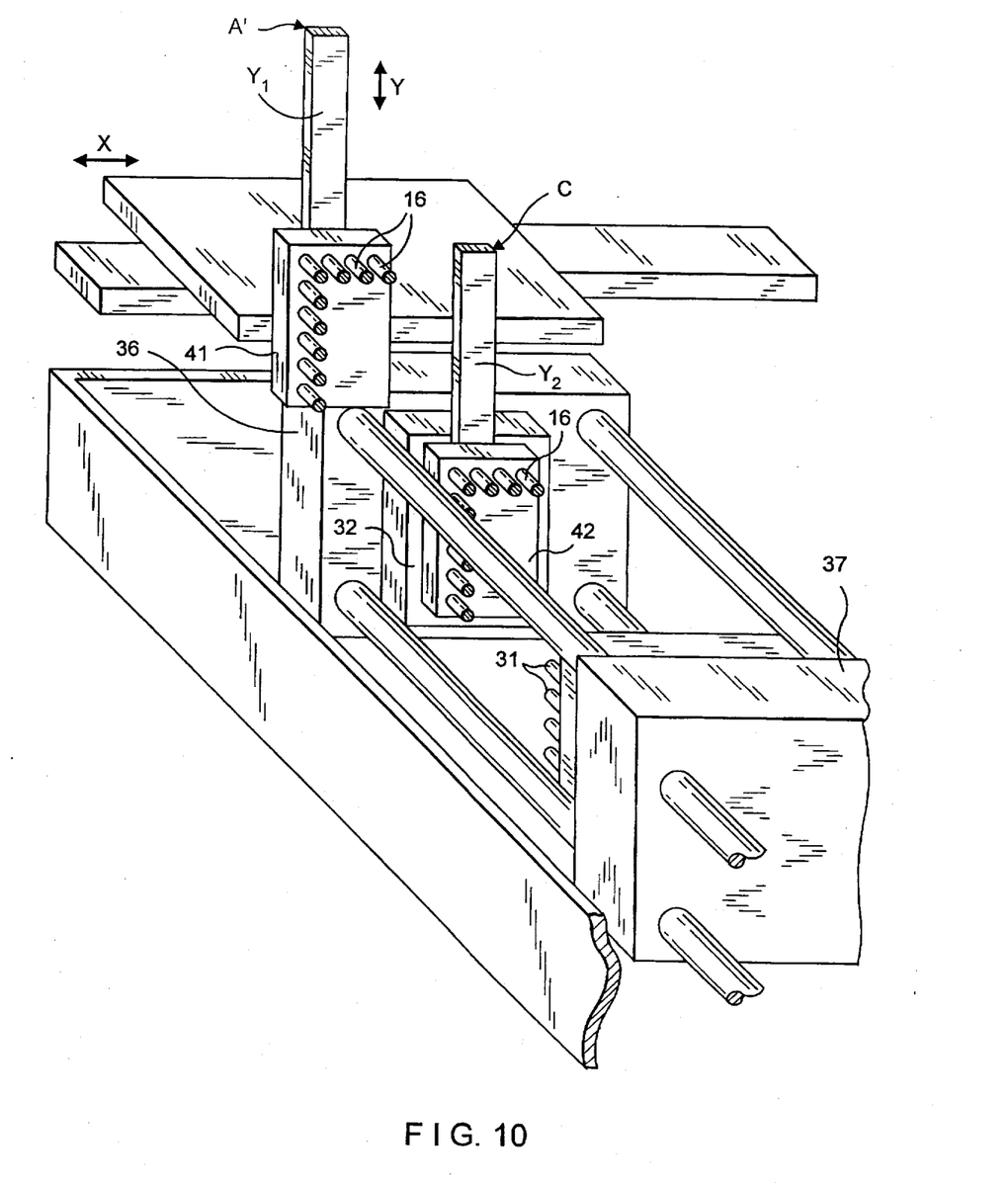

During cycle SV1 the machine opens at the end of the cooling time, and injected preforms are resting on the mandrel side. When a space is formed between mandrel side and cavity side of the moulds which is large enough to move the second gripper arm 42 into said space in working position C, and a reliable transfer of the preforms is made possible, the second gripper arm 42, which is driven by a second motor 22, passes between the two mould sides, into transfer position C, as can be seen in FIG. 10. Here, gripper arm 42 takes over a complete further set of preforms S2 from the mould. When the transfer has been completed, the second gripper element 42 is transferred in the Y2 direction to the disconnected position, where the preforms are held in corresponding sleeve 16 of the gripper element 42 during a subsequent cycle SV2, which starts when the gripper element 42 is driven to the disconnected position B.

In the meantime, the preforms of cycle S1 are still present in the second gripper arm 42. Shortly before the end of the cycle SV2, the first gripper arm 41 is moved into the disconnected position B, and thereby also the second gripper arm 42 into the non-active waiting position shown at A' in FIG. 10. After the first gripper arm 41 has reached the disconnected position, its preforms 50 are removed by known means. During cycle SV2 the machine opens at the end of the cooling period and injected preforms are resting on the mandrels of the mandrel side. When a space 34 is formed between mandrel side and cavity side of the mould which is large enough to receive the gripper arm, and a reliable transfer of the preforms is possible, gripper arm 41, being driven by motor 21, passes between the mandrel side and cavity side of the mould, into working position C, and takes over a complete set of preforms SV2 from the mould. When the transfer has been completed, the first gripper arm 41 is driven in the Y1 movement to the disconnected position B.

In that position the preforms are held in the corresponding sleeves of the first gripper arm 41 during a subsequent cycle SV3, which starts when the first gripper element 41 goes into the disconnected position. In the meantime, the preforms SV2 are still present in the second gripper arm 42. Shortly before the ending of the cycle SV3, the second gripper arm 42 moves into the disconnected position B, and first gripper arm 41 is also moved into non-active waiting position A. After the second gripper arm 42 has reached the disconnected position, its preforms are removed by known means.

During cycle SV3 the machine opens at the end of the cooling period. Injected preforms are then resting on the mandrel side of the mould. When a space has formed between mandrel side and cavity side which is large enough to place the gripper arm between them, and a reliable transfer of the preforms is possible, gripper arm 42, driven by second motor 22, passes between the respective mould sides to transfer position C, and takes over a complete set of preforms SV3 from the mould. When the transfer has been completed, the second gripper arm 42, driven by motor 22, passes in Y2 movement to the disconnected position. In that position the preforms are held in the second gripper arm 42 during the next cycle SVn, which starts when the gripper arm 42 goes into the disconnected outboard position B. In the meantime, the preforms SV2 are still present in the gripper arm. Shortly before the ending of the cycle SVn, the first gripper arm 41 is driven to the disconnected position B, and the second gripper arm 42 is also moved to non-active waiting position A. After the first gripper arm 41 has reached the disconnected position, the preforms of said first gripper arm 41 are removed by known means.

The abovementioned steps are repeated for the next cycle, in a repeated process.

It should be understood that in cycle S1 the two gripper arms 41 and 42 are regarded as being empty, so that their mutual interaction can be explained better.

Thanks to this invention the preforms remain longer in the cooled sleeves, i.e. two cycle times—minus the time for the release of the preforms—in the disconnected position, until the following cycle.

The preforms are also of better quality, for they are less damaged and less bent. This in addition leads to a better subsequent processing of the PET preform in a blow moulding machine, where each preform is given its final form by blow moulding it, for example to a PET bottle.

A shortened cycle time is also obtained. The internal cooling time of an injection moulding process is partially transferred to the external cooling of the gripper arm, with the result that the injection moulding process can be maintained undisturbed (and not interrupted by an internal cooling cycle).

Furthermore, the accessibility of the mould is considerably improved. Due to the fact that the method is carried out in the vertical direction, less space is required, since everything is carried out in the vertical direction, such as said Y movement of the gripper arms. Consequently, the front and rear sides of the mould are easily accessible. This is particularly beneficial in the case of repairs or when changing the type of preform to be manufactured.

It should also be pointed out that the abovedescribed invention can be used for all hollow plastic products. Thanks to the vertical Y movement, it is also possible to dispense with heavy frames for the gripper arms, which has a beneficial effect on their handling. If necessary, two bearing plates or bearing tables 10 can be used, namely each with one gripper arm (separate control).

What is claimed:

1. Method for manufacturing hollow plastic preforms for subsequent processing to plastic objects, comprising injecting raw material for manufacturing said preforms (50) into a mould (30) which has a cavity side (32) and a corresponding mandrel side (13), between which sides the preforms (50) are formed, opening the mould at its cavity side and mandrel side, transferring the preforms to mandrels (31) at the mandrel side, moving a first gripper element (41) having a set of accommodation elements (16) thereon by a drive unit (21) in a preset direction of movement between a deflected, disconnected position (B), in which said first gripper element (41) is not active, and a working position (C) at which said accommodation elements (16) are directed towards the mandrel side of the mould, transferring the preforms (50) to said accommodation elements of the first gripper element (41) by suction means (60), each preform being accommodated in a corresponding accommodation element (16), moving at least one second gripper elements (42) by a second drive unit (22), between said disconnected position (B) and said working position (C) at the mandrel side (33) of the mould (30), and synchronizing the movements of said first and said at least one second gripper elements (41, 42) with each other to receive and discharge the formed preforms in succession.

2. Method according to claim 1, wherein the gripper elements (41, 42) are moved in a to and fro movement in the direction of their respective longitudinal axes (Y1, Y2), the gripper elements (41, 42) being disposed above the mould (30), and their respective movements relative to each other being shifted in time.

3. Method according to claim 1, wherein said at least two gripper elements (41, 42) are disposed on a carrier (10) in an erection plane which is substantially perpendicular relative to the ground and are moved in said erection plane in a second direction, by a further drive unit (11) between a waiting position (A) and said disconnected working position (B).

4. Method according to claim 1, wherein said first gripper element and said at least one second gripper element are moved successively in two directions of movement which are substantially orthogonal relative to each other, said first direction of movement being selected so that it is substantially vertical relative to the ground, and said first and said at least one second gripper elements being moved between a high location for said disconnected position (B) and a low location for said working position (C).

5. Method according to claim 1, comprising setting a first cooling time for cooling the injected preforms (50) at the cavity side (32), at the end of the set first cooling time separating the cavity side (32) and the mandrel side (33) of the mould (30) from each other to form a space (34) between them which is sufficient for the insertion of one of said gripper elements (41, 42), the accommodation elements (16) of said one gripper element being directed towards the mandrel side (33), moving said first gripper element from said high position (B) into said space (34), and thus into said low working position (C) relative to the mandrel side, and cooling the preforms (50) by cooling the corresponding accommodation elements during a second cooling time, at the end of which the preforms are passed from the mandrel side to respective accommodation elements of said first gripper element corresponding to each mandrel (33), following which said first gripper element is moved back to the disconnected, high position (B), moving said first gripper element and said at least one second gripper element crosswise until said at least one second gripper element is in the disconnected, high position (B) and the said first gripper element is in a waiting position (A), and the movement carried out by said first gripper element during the completed cycle is then carried out by said at least one second gripper element, and a further set of preforms (50) is then taken over by the said at least one second gripper element from the mandrel side of the mould (30), and said at least one second gripper element is then driven back to the high position (B).

6. Apparatus for manufacturing hollow plastic preforms intended for subsequent processing to plastic objects, comprising a mould (30) for forming said preforms (50), which mould has a cavity side (32) and a mandrel side (33), which sides are movable apart, a number of projecting mandrels (31) disposed on said mandrel side of the mould for holding the preforms, a first gripper element (41) provided with a set of accommodation elements (16) which are directed at said mandrels (31), for cooling and receiving the preforms, said first gripper element being movable, by a drive unit (21), between a disconnected position (B) and a working position (C) in which said first gripper element is connected to the mandrel side (33), at least one second gripper element (42) equipped with a further set of accommodation elements (26) directed towards the mandrels (31) on the mandrel side of the mould (30), said at least one second gripper element (42), being driven by a further drive unit (22) to be moved between said disconnected position (B) and said working position (C), said at least one second gripper element (42) being moved in synchronization with said first gripper element to receive and discharge the formed preforms in succession.

7. Method according to claim 2, wherein said at least two gripper elements (41, 42) are disposed on a carrier (10) in an erection plane which is substantially perpendicular relative to the ground and are moved in said erection plane in a second direction, by a further drive unit (11) between a waiting position (A) and said disconnected working position (B).

8. Method according to claim 1, wherein said first and said at least one second gripper elements (41, 42) are moved in a to and fro movement in the direction of their respective longitudinal axes (Y1, Y2), said first and said at least one second gripper elements (41, 42) being disposed above the mould (30), and their respective movements relative to each other being shifted in time, and wherein said first and said at least one second gripper elements (41, 42) are disposed on a carrier (10) in an erection plane which is substantially perpendicular relative to the ground and are moved in said erection plane in a second direction, by a further drive unit (11) between a waiting position (A) and said disconnected position (B), and wherein said first and said at least one second gripper elements are moved successively in two directions which are substantially orthogonal relative to each other, said first direction of movement being selected so that it is substantially vertical relative to the ground, and said first and said at least one second gripper elements being moved between a high location for said disconnected position (B) and a low location for said working position (C).

9. Method according to claim 5, wherein said first and said at least one second gripper elements (41, 42) are moved in a to and fro movement in the direction of their respective longitudinal axes (Y1, Y2), said first and said at least one second gripper elements (41, 42) being disposed above the mould (30), and their respective movements relative to each other being shifted in time, and wherein said first and said at least one second gripper elements (41, 42) are disposed on a carrier (10) in an erection plane which is substantially perpendicular relative to the ground and are moved in said erection plane in a second direction, by a further drive unit (11) between a waiting position (A) and said disconnected position (B), and wherein said first and said at least one second gripper elements are moved successively in two directions which are substantially orthogonal relative to each other, said first direction of movement being selected so that it is substantially vertical relative to the ground, and said first and said at least one second gripper elements being moved between a high location for said working position (B) and a low location for said working position (C).

* * * * *